United States Patent Office 2,970,997
Patented Feb. 7, 1961

2,970,997
PROCESS FOR THE MANUFACTURE OF ε-CAPROLACTAM

Kürt Fischer, Neuotting, Upper Bavaria, and Hans Oberraüch, Burgkirchen, Upper Bavaria, Germany, assignors to Farbwerke Hoechst Aktiengesellschaft vormals Meister Lucius & Bruning, Frankfurt am Main, Germany, a corporation of Germany No Drawing. Filed Jan. 28, 1958, Ser. No. 711,556
Claims priority, application Germany Feb. 1, 1957
1 Claim. (Cl. 260—239.3)

The present invention relates to a process for preparing ε-caprolactam.

It is known to prepare ε-caprolactam on an industrial scale by a rearrangement of the cyclohexanone-oxime by means of sulfuric acid. Phenol or nitrobenzene or cyclohexane constitute the base of the cyclohexanone-oxime.

In order to replace the phenol used as base different methods have been proposed for the manufacture of ε-caprolactam. Owing to the high costs, these methods did, however, not gain any industrial importance.

The following diagram shows a number of processes in which acetylene is used as starting material:

of ethylene and carbon tetrachloride. The product thus obtained is then saponified with sulfuric acid to yield ω-chlorovaleric acid and then esterified with monoalkyl ethers of alkanediols with 2 to 4 carbon atoms which, in the alkyl group, contain 1 to 4 carbon atoms. The ester is converted into the corresponding ω-cyanester by means of an alkali cyanide or an alkaline-earth cyanide such as, for example, sodium cyanide or calcium cyanide, and the ω-cyanester is then subjected to a catalytic hydrogenation under low pressures. The course of the reaction is illustrated by the following scheme of formulae in which Me represents an alkali metal or an alkaline earth metal and in which the alkanediolmonoalkyl ether is ethyleneglycolmonethyl ether:

(1) $CCl_4 + 2C_2H_4 \rightarrow Cl_3C-(CH_2-CH_2)_2-Cl$ (2)
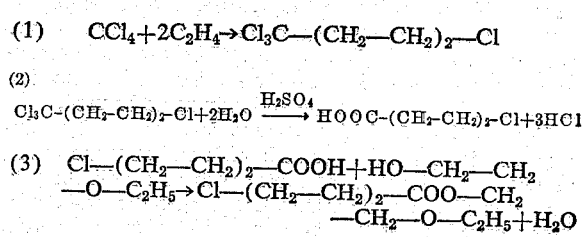

(3) $Cl-(CH_2-CH_2)_2-COOH + HO-CH_2-CH_2$
   $-O-C_2H_5 \rightarrow Cl-(CH_2-CH_2)_2-COO-CH_2$
   $-CH_2-O-C_2H_5 + H_2O$

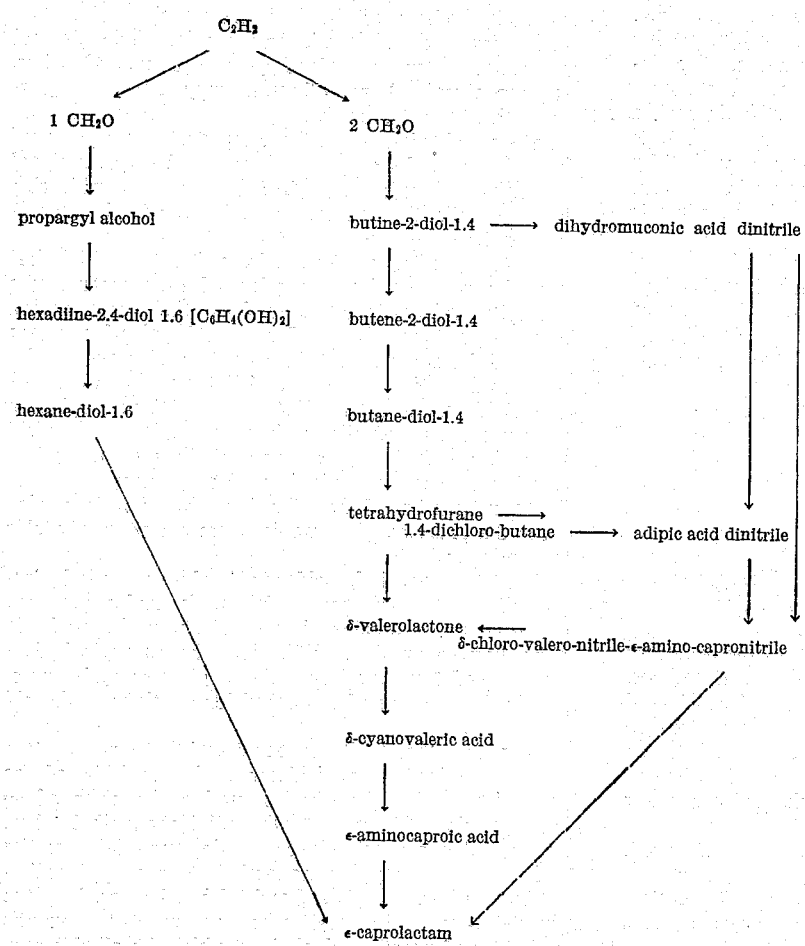

Now, we have found that ε-caprolactam can be obtained in a simple manner and with a good yield by first preparing α-chloro-ω-trichloropentane by telomerization (4) $Cl-(CH_2-CH_2)_2-COO-CH_2-CH_2-O$
   $-C_2H_5 + MeCN \rightarrow NC-(CH_2-CH_2)_2$
   $-COO-CH_2-CH_2-O-C_2H_5 + NaCl$ (5)

$$NC-(CH_2-CH_2)_2-COO-CH_2-CH_2-O-C_2H_5 \xrightarrow{Ni}$$

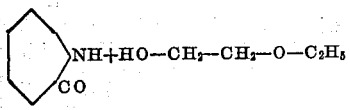

The process offers the following advantages: Ethylene and carbon tetrachloride which are today available on a commercial scale and at a low price can be used as basic material instead of phenol. The individual steps of the process can be effected in a technically simple way and most of the byproducts forming during the process can be well utilized.

It is, for example, possible to prepare dicarboxylic acids from the high-molecular homologs of α-chloro-ω-trichloro-pentane forming during the telomerization, while the hydrogen chloride forming in the second stage of the reaction may be applied further. The alkanediolmono-alkyl ether applied in the third stage for the esterification is recovered in the last stage and may again be used.

The 1-chloro-5-trichloropentane is prepared by telomerization from carbon tetrachloride and ethylene in the presence of a reaction promoter such as azodiisobutyric acid dinitrile, organic peroxides or metallic carbonyls. When carrying out the reaction, the ethylene is pressed on to the carbon tetrachloride, for example under a pressure of about 50 atmospheres (gauge) and at a temperature within the range of about 70° to 100° C. The mixture that forms during this procedure always consists of homologous products of tetrachloralkanes. By observing certain conditions of temperature and pressure, it is, however, possible to control the reaction in such a manner that the desired 1-chloro-5-trichloropentane is obtained as chief product and that it can be separated by a fractional vacuum distillation from the reaction mixture forming. The execution of the aforesaid reaction is illustrated by the following example:

1000 grams of carbon tetrachloride and 15 grams of azodiisobutyric acid dinitrile are introduced into a high pressure autoclave. Then ethylene is pressed on at 70° C. and under a pressure of 50 atmospheres (gauge) until a fall in pressure no longer occurs. During this process there form, simultaneously, 112 grams of tetrachloropropane,
725 grams of tetrachloropentane,
317 grams of tetrachloroheptane,
61 grams of tetrachlorononane.

The tetrachloropentane which is the chief product is then isolated by a fractional vacuum distillation.

The 1-chloro-5-trichloropentane is then saponified with concentrated sulfuric acid in the presence of the necessary amount of water whereby hydrogen chloride is split off and ω-chlorovaleric acid is obtained in a yield of 82% of the theoretical yield. When the mixture of concentrated sulfuric acid and the necessary amount of water is added while stirring, to the tetrachloropentane, it is of advantage to introduce the said mixture of sulfuric acid and water under the surface of the tetrachloropentane.

The ω-chlorovaleric acid is then continuously esterified, in the presence of an acid esterification catalyst such as concentrated sulfuric acid or hydrogen chloride and a solvent such as carbon tetrachloride, with an alkanediol-monoalkyl ether whose diol-component contains 2 to 4 carbon atoms and whose alkyl radical contains 1 to 4 carbon atoms, for example one of the ether alcohols mentioned below. The esterification is effected by continuously distilling off the water formed during the esterification together with the carbon tetrachloride used as solvent, the two substances being distilled off as an azeotropic mixture. The ester of the ω-chlorovaleric acid and ethyleneglycolmonoethyl ether, for example, is obtained in a yield of 90% of the theoretical yield.

In the following stage, the chlorine of the ester of ω-chlorovaleric acid and alkanediol-monoalkyl ether is exchanged for the cyano group. Several methods are known from literature to effect this exchange. Thus the ω-halogenated carboxylic acid esters may be reacted with KCN either in absolutely alcoholic or in common alcoholic solution in order to obtain, for example, the β-cyanopropionic acid ethyl ester from β-chloropropionic acid ethyl ester in a yield amounting to 67%. ε-Cyanocaproic acid is obtained in a yield amounting to 56% when ε-bromocaproic acid is reacted with NaCN in an aqueous sodium carbonate solution.

In contrast thereto, it has now been found that, for example, the ester of ω-cyanovaleric acid and ethylene glycol monoethyl ether is obtained from the corresponding chlorine compound in a yield amounting to 86% of the theory when the reaction is carried out in monoalkyl ethers of alkanediols or dialkyl ethers of alkanetriols having 2–4 carbon atoms whose alkyl groups contain 1–4 carbon atoms, or in monoaryl ethers such as, for example, phenyl ether of ethylene glycol, or in the cyclic ether alcohol tetrahydrofurfuryl alcohol and in the presence of small quantities of iodine, for example 0.016 gram of iodine per 297 grams of the ester of δ-chlorovaleric acid and ethylene glycol monoethyl ether to be reacted.

As suitable alkanediol monoalkyl ethers and alkanetrioldialkyl ethers of the indicated number of carbon atoms there are mentioned, for example, ethylene glycol monoethyl ether, propylene glycol monoethyl ether, butylene glycol-1,4- or -1,3-monopropyl ether and glyceroldiethyl ether-1,3 or -1,2.

In the following stage, the ε-caprolactam is prepared from the ester of ω-cyanovaleric acid and ethylene glycol monoethyl ether in good yield in one stage with ring closure, while the ethylene glycol monoethyl ether is recovered.

Several processes are known from literature which deal with the catalytic hydrogenation of ω-cyanocarboxylic acids, its amides or esters to form the corresponding lactames or amino acids. For example, piperidones are prepared from γ-cyanoalkyl carboxylic acids, the amides or esters thereof at pressures of 150 atmospheres (gauge) in a yield amounting to 50 to 80%. When employing other processes, pyrrolidone is only obtained in a yield amounting to 38% in the course of the catalytic hydrogenation of β-cyanopropionic acid ethyl ester at 100 to 200 atmospheres. When the hydrogenation is carried out in the presence of ammonia, there are obtained yields amounting to 91%.

When δ-cyanovaleric acid or one of its esters is hydrogenated in the presence of ammonia under pressure, ε-caprolactam is obtained in a yield amounting to 30%. According to another publication, the catalytic hydrogenation of δ-cyanovaleric acid ethyl ester under pressure in the presence of ethanol yields ε-aminocaproic acid ethyl ester.

In contrast thereto, it has been found that ε-caprolactam can be obtained in a yield amounting to 70% of the theoretical yield when hydrogenating the ester of ω-cyanovaleric acid and an alkanediol monoalkyl ether. Esters which are suitable as starting materials are the esters of ethylene glycol monoethyl ether, propylenediol-1,2-butyl ether, propyleneglycol-1,3-butyl ether, butylene glycol-1,4- or 1,3-propyl ether or an ω-cyanovaleric acid ester of an ether alcohol, in which the alkyl group, in addition to being bound via oxygen, is bound also directly to a carbon atom of the glycol such as, for example, in tetrahydrofurfuryl alcohol. The hydrogenation is carried out in the presence of hydrogenation catalysts such as, for example, Raney-nickel or nickel on kieselguhr with or without water, but preferably without water, and under pressures of 5 to 50 atmospheres, preferably under a pressure of 10 atmospheres.

The reaction mixture of monomeric and polymeric ε-caprolactam can be worked up, for example in the following way. The polymeric ε-caprolactam can be converted into monomeric caprolactam by thermal splitting in the presence of small amounts of alkali or alkaline earth metal compounds having an alkaline reaction, more especially the oxides, hydroxides and alcoholates of, for example, sodium or calcium or in the presence of substances of acid reaction such as perborates or percarbonates. The operation is preferably carried out under reduced pressure and at temperatures within the range of 280 to 360° C. The decomposition may, on the other hand, also be effected under an excess pressure or under normal pressure and at temperatures within the range of about 200 to 400° C. and with the application of superheated steam in the presence of organic or inorganic acids or alkalies that are not volatile with steam.

The following examples serve to illustrate the invention but they are not intended to limit it thereto, the parts being by weight unless otherwise stated and the relationship of parts by weight to parts by volume being the same as that of the kilogram to the liter:

EXAMPLE 1

*Preparation of 1-chloro-5-trichloropentane*

The 1-chloro-5-trichloropentane which was used as starting material was prepared by the telomerization of carbon tetrachloride with ethylene according to the following equation:

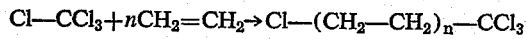

The reaction was carried out at about 100° C. under a pressure of 50 atmospheres (gauge) in the presence of a reaction promotor such as azodiisobutyric acid dinitrile, an organic peroxide or a metallic carbonyl. The reaction mixture of tetrachloroalkanes was subjected to a vacuum distillation and tetrachloropentane was obtained as the chief product.

EXAMPLE 2

*Preparation of δ-chlorovaleric acid*

252 parts of tetrachloropentane were introduced into a suitable vessel and 300 parts of sulfuric acid of 93 percent strength were added at room temperature while stirring vigorously. The vessel was heated to 95° C. within one hour while stirring vigorously. Subsequently a mixture of 34 parts of distilled water and 66 parts of sulfuric acid of 93 percent strength was introduced within 10 to 14 minutes under the surface of the mixture. The whole was then heated for another hour to 95° C. During the whole time a vehement evolution of hydrogen chloride took place. The hydrogen chloride was discharged via a gas cooling trap. The reaction mixture was then cooled to 10° C. and poured on to 500 parts of finely ground ice. During this procedure the major part of the δ-chlorovaleric acid was obtained in a solid form. The mother liquor was extracted by means of carbon tetrachloride and the solid chlorovaleric acid was then combined with the extract. By a vacuum distillation which was carried out at a temperature within the range of 99 to 103° C. and under a pressure of 1.5 mm. of mercury 135 parts of δ-chlorovaleric acid, i.e. 82.4 percent of the theoretical yield, were obtained.

EXAMPLE 3

*Preparation of the ester of δ-chlorovaleric acid and ethyleneglycol-monoethyl ether*

273.2 parts of chlorovaleric acid, 800 parts by volume of carbon tetrachloride, 450 parts of ethyleneglycolmonoethyl ether and 6.6 parts by volume of concentrated sulfuric acid were introduced into a suitable vessel. The reaction mixture was boiled for 8 hours and the water which separated during the reaction was continuously eliminated by continuously distilling off the reaction water formed and the carbon tetrachloride serving as solvent, the two substances forming an azeotropic mixture. The carbon tetrachloride which had been distilled off could be reintroduced into the reaction flask after it had been separated from the water. After cooling a neutralization was carried out and the whole reaction mixture was subjected to a fractional distillation effected first under normal pressure in order to eliminate the carbon tetrachloride and the excess amount of ethyleneglycol-monoethyl ether and subsequently effected in vacuo to recover the ester. Under a pressure of 12 mm. of mercury 360.6 parts of ester distilled over at a temperature within the range of 139 to 144° C. This yield corresponded to 86 percent of the theoretical yield.

EXAMPLE 4

*Preparation of the ester of δ-cyanovaleric acid and ethyleneglycol-monoethyl ether*

83.3 parts of pulverized sodium cyanide, 630 parts of ethyleneglycol-monoethyl ether and a small amount of iodine were introduced into a reaction vessel. While stirring vigorously the mixture was heated on an oil bath to such a temperature that a marked reflux could be observed in the reflux condenser. 297.5 parts of the ester of δ-chlorovaleric acid and ethyleneglycolmonoethyl ether were then added in the course of 45 minutes. To finish the reaction the whole was boiled under reflux for another 10 hours. After separation of the common salt 245 parts of the ester of δ-cyanovaleric acid and ethyleneglycol-monoethyl ether (86.2 percent of the theoretical yield) were obtained by way of a distillation carried out in vacuo under a pressure of 0.6 mm. of mercury and at a temperature of 135° C.

EXAMPLE 5

*Preparation of ε-caprolactam*

48 parts of Raney nickel which had previously been freed from water and 320 parts of the ester of δ-cyanovaleric acid and ethyleneglycol-monoethyl ether were introduced into an autoclave of chrome-nickel-molybdenum steel and 45 atmospheres (gauge) of hydrogen were pressed on to the mixture. The autoclave was then heated to 100° C. and a pressure of hydrogen of 10 atmospheres (gauge) was maintained until the absorption ceased. After cooling the reaction mixture was washed out of the autoclave by means of ethyleneglycol-monoethyl ether and freed from the catalyst. After the elimination of the solvent a distillation residue consisting of 210.3 grams of a mixture of monomeric and polymeric ε-caprolactam remained behind. This residue was distilled in the presence of sodium hydroxide solution in vacuo under a pressure of 13 mm. mercury and at an internal temperature within the range of 320 to 350° C. 127.4 parts of monomeric ε-caprolactam (B.P. $_{11}$=140 to 143° C.) were obtained. This yield corresponded to 70 percent of the theoretical yield.

We claim:

In a process for the manufacture of ε-caprolactam comprising preparing α-chloro-ω-trichloropentane, saponifying said trichloropentane to obtain ω-chlorovaleric acid, esterifying said acid, converting the ester into its corresponding ω-cyanester, and hydrogenating said cyanester to form the caprolactam, the improvement comprising reacting at elevated temperature said ester of α-chlorovaleric acid and an alkanediol monoalkyl ether, of which the alkane-diol contains 2 to 4 carbon atoms and the alkyl group contains 1 to 4 carbon atoms, with a metal salt of the hydrocyanic acid selected from the group consisting of alkaline metal cyanides and alkaline earth metal cyanides and mixtures thereof in the presence of a solvent and a small amount of iodine, said solvent being a partially etherified dihydric to trihydric aliphatic alcohol, in which the alcohol component contains 2 to 4 carbon atoms and in which all but one of the hydroxy groups are etherified with alkyl radicals from 1 to 4 carbon atoms to form the ester of α-cyanovaleric acid with the said alkane-diol monoalkyl ether.

References Cited in the file of this patent

FOREIGN PATENTS 898,359     France                 July 3, 1944

OTHER REFERENCES

Noller: Chemistry of Organic Compounds, W. B. Saunders Co., Philadelphia (1957), pp. 725 and 784.

Karrer: Organic Chemistry (1938), Nordeman Publishing Co. Inc., New York, p. 167.